United States Patent
Hayden et al.

(10) Patent No.: US 12,092,342 B2
(45) Date of Patent: Sep. 17, 2024

(54) DIRECT CURRENT ELECTRIC ON-DEMAND WATER HEATER

(71) Applicant: Rheem Manufacturing Company, Atlanta, GA (US)

(72) Inventors: Christopher Mark Hayden, Shelton, CT (US); Sergiu G. Mihu, Newton, CT (US); Eric Robert Jurczyszak, Berlin, CT (US)

(73) Assignee: Rheem Manufacturing Company, Atlanta, GA (US)

( * ) Notice: Subject to any disclaimer, the term of this patent is extended or adjusted under 35 U.S.C. 154(b) by 0 days.

(21) Appl. No.: 18/211,028

(22) Filed: Jun. 16, 2023

(65) Prior Publication Data

US 2023/0324052 A1    Oct. 12, 2023

Related U.S. Application Data

(63) Continuation of application No. 16/806,119, filed on Mar. 2, 2020, now Pat. No. 11,692,718.

(51) Int. Cl.
*F24D 17/00* (2022.01)
*F24D 17/02* (2006.01)
(Continued)

(52) U.S. Cl.
CPC ......... *F24D 17/0068* (2013.01); *F24D 17/02* (2013.01); *F24H 1/06* (2013.01);
(Continued)

(58) Field of Classification Search
CPC .. F24D 17/02; F24D 17/0068; F24D 2105/00; F24D 2101/40; F24D 18/00;
(Continued)

(56) References Cited

U.S. PATENT DOCUMENTS 8,230,911 B2 * 7/2012 Seerup ............... F24D 19/1009
                                                    237/63
9,063,551 B2    6/2015 Deivasigamani et al.
(Continued)

FOREIGN PATENT DOCUMENTS

EP    3428547 A1 *  1/2019  ............ F24D 10/00
RU    2295095 C1    3/2007

OTHER PUBLICATIONS

International Search Report and Written Opinion for PCT Application No. PCT/US2021/020204 dated Jun. 10, 2021.
(Continued)

*Primary Examiner* — Shafiq Mian
(74) *Attorney, Agent, or Firm* — Eversheds Sutherland (US) LLP

(57) ABSTRACT

The disclosed technology includes an on-demand water heater which uses an electric heat source to heat the water. The on-demand water heater can have a low fluid capacity heating chamber which has an inlet and an outlet, an electric heat source for heating the water, and a controller to control the electric heat source and maintain the temperature of the water at a predetermined temperature setting. The on-demand water heater can be powered by a direct current power source. The on-demand water heater can also utilize a solar thermal system to provide additional heat to the water.

20 Claims, 4 Drawing Sheets

(51) Int. Cl.
| | |
|---|---|
| *F24H 1/06* | (2022.01) |
| *F24H 9/20* | (2022.01) |
| *F24H 15/172* | (2022.01) |
| *F24H 15/174* | (2022.01) |
| *F24H 15/215* | (2022.01) |
| *F24H 15/219* | (2022.01) |
| *F24H 15/223* | (2022.01) |
| *F24H 15/238* | (2022.01) |
| *F24H 15/37* | (2022.01) |
| *F24H 15/375* | (2022.01) |
| *F24H 15/421* | (2022.01) |
| *F24S 10/00* | (2018.01) |
| *G05B 15/02* | (2006.01) |
| F24D 18/00 | (2022.01) |
| F24D 101/40 | (2022.01) |
| F24D 105/00 | (2022.01) |
| F24H 15/156 | (2022.01) |
| F24H 15/20 | (2022.01) |
| F24H 15/265 | (2022.01) |
| F24H 15/281 | (2022.01) |
| F24H 15/45 | (2022.01) |

(52) U.S. Cl.
CPC ......... *F24H 9/2021* (2013.01); *F24H 15/172* (2022.01); *F24H 15/174* (2022.01); *F24H 15/215* (2022.01); *F24H 15/219* (2022.01); *F24H 15/223* (2022.01); *F24H 15/238* (2022.01); *F24H 15/37* (2022.01); *F24H 15/375* (2022.01); *F24H 15/421* (2022.01); *F24S 10/00* (2018.05); *G05B 15/02* (2013.01); F24D 18/00 (2022.01); F24D 2101/40 (2022.01); F24D 2105/00 (2022.01); *F24H 15/156* (2022.01); *F24H 15/20* (2022.01); *F24H 15/265* (2022.01); *F24H 15/281* (2022.01); *F24H 15/45* (2022.01); *F24H 2240/01* (2013.01); *F24H 2250/02* (2013.01)

(58) Field of Classification Search
CPC .... F24H 15/215; F24H 15/174; F24H 15/172; F24H 15/375; F24H 15/37; F24H 15/219; F24H 15/223; F24H 15/421; F24H 15/238; F24H 1/06; F24H 9/2021; F24H 15/45; F24H 15/265; F24H 15/20; F24H 15/156; F24H 15/281; F24H 2240/01; F24H 2250/02; F24S 10/00; G05B 15/02
See application file for complete search history.

(56) References Cited

U.S. PATENT DOCUMENTS

| | | | |
|---|---|---|---|
| 9,702,585 B2* | 7/2017 | Hayden | ................. F24H 1/0018 |
| 2005/0013595 A1* | 1/2005 | Israelson | ............. G05D 23/1931 |
| | | | 392/449 |
| 2010/0074602 A1 | 3/2010 | Israelsohn et al. | |
| 2010/0166398 A1 | 7/2010 | Witt | |
| 2014/0321839 A1 | 10/2014 | Armstrong | |
| 2017/0219220 A1 | 8/2017 | Girafi | |
| 2017/0268800 A1* | 9/2017 | Hayden | ................. F24H 1/0018 |

OTHER PUBLICATIONS

Extended European Search Report for European Application No. 21764075.4 mailed Feb. 15, 2024 (11 pp.).

* cited by examiner

DIRECT CURRENT ELECTRIC ON-DEMAND WATER HEATER

CROSS-REFERENCE TO RELATED APPLICATIONS

This application is a continuation of U.S. application Ser. No. 16/806,119, filed Mar. 2, 2020, which is incorporated herein by reference.

FIELD OF THE TECHNOLOGY

The present disclosure relates generally to water heaters, and, more particularly, to on-demand water heaters that utilize a direct current power source to heat the fluid.

BACKGROUND

Water is commonly heated for many reasons, including: to kill bacteria, to cook, and to provide a more pleasing water temperature. Before the development of electrical power, the most common method of heating water involved the use of combustible matter. Initially, this involved burning wood or other solids but later developed into the use of gaseous fuels, such as propane or natural gas. Unfortunately, the burning of combustible matter carries the additional risks of fire or asphyxiation. Therefore, as electrical power became widely adopted, it became common to use electricity to heat the water.

Traditionally, heating water with electricity involved the use of a large insulated storage tank to store heated water and periodically adding heat as the water temperature fell below a predetermined temperature setting. However, the use of a large storage tank can be inefficient, for example, because water must be heated even when it is not being used. To combat this problem, more recent water heater designs have reduced the need for a large storage tank and heat the water only when demanded. Unfortunately, these electrical on-demand water heaters, also known as "instantaneous" or "tankless" water heaters, require much larger electrical loads when heated water is demanded. Because of this, electrical on-demand water heaters are typically only installed in a home or commercial building that can provide alternating current (AC) power and is capable of handling the larger electrical loads.

Advances in solar and wind power generation have begun to make direct current (DC) power an attractive option for many homeowners. However, even where access to a DC power source is available, the user generally must install inverters to convert the DC power to AC power because most electrical appliances used in a home (including water heaters) are configured to operate using AC power. Unfortunately, the use of an inverter can result in energy losses and can add a substantial cost to the use of DC power, making it impractical in many cases. What is needed, therefore, are systems and methods for heating water using DC power while minimizing or eliminating power loss, such as those caused by on-site power inversion.

BRIEF SUMMARY

These and other problems can be addressed by the technologies described herein. Examples of the disclosed technology relate generally to an on-demand water heater which can be powered by a direct current power source without the need for costly inverters.

The disclosed technology includes a fluid heating device having a direct-current-powered heat source configured to heat water based on a predetermined temperature setting and flow. The direct current (DC) electric fluid heating device can include a heating chamber having a fluid inlet and a fluid outlet. The heating chamber can be configured to hold a fluid and can have a low fluid capacity. The DC fluid heating device can also have an electric heat source for heating the fluid and a controller configured to maintain the fluid at a predetermined temperature setting by modulating a direct current supplied to the electric heat source from a DC power source based on a predetermined temperature setting. The DC electric fluid heating device can be portable or stationary.

The DC electric fluid heating device can have a low fluid capacity heating chamber which is no more than 5 gallons or, alternatively, no more than 2 gallons.

The DC electric fluid heating device can be configured to connect directly to a DC power source, which can be a photovoltaic energy system, an energy storage device, or a combination thereof. The energy storage device can be a battery, for example.

The DC electric fluid heating device can include or be in communication with a solar thermal fluid heating system configured to preheat the fluid entering the DC electric fluid heating device. The solar thermal fluid heating system can include a storage tank configured to store the preheated fluid. The DC electric fluid heating device can be configured to receive preheated water from the storage tank and/or provide heated water to the storage tank.

The controller of the DC electric fluid heating device can be configured to learn a usage pattern of one or more users. The controller can be configured to receive data and/or a signal that indicates the presence of a user (e.g., from a motion sensor located near a spigot in communication with the DC electric fluid heating device) and determine whether to send a control signal to the electric heat source to heat the fluid based on the receive data and/or signal.

The electric heat source of the DC electric fluid heating device can include a resistive heating element. The electric heat source can include a heat pump. The DC electric fluid heating device can be configured to also receive an alternating current (AC) power source.

The disclosed technology includes a method for controlling a fluid heating system. The method can comprise sensing (e.g., by a flow sensor) a flow of a fluid and sensing (e.g., by a temperature sensor) a temperature of the fluid. The method can include transmitting instructions (e.g., by a controller) to an electric heat source (which can be powered by a DC power source) to heat the fluid in a low fluid capacity heating chamber in response to determining that the flow is positive. The method can include transmitting instructions (e.g., by the controller) to the electric heat source to heat the fluid in a low fluid capacity heating chamber. The method can include transmitting instruction (e.g., by the controller) to a solar thermal system to preheat the fluid. The method can also include storing at least some of the fluid in a storage tank.

The disclosed technology also includes a system comprising a low fluid capacity heating chamber, an electric heat source, a controller, and a memory having instructions stored on it. The instructions, when executed by the controller, can direct the controller to receive flow data from a flow sensor and temperature data from a temperature sensor. The instructions, when executed by the controller, can direct the controller to output a first electric heat source control signal in response to determining that the flow data indicates a positive flow. The instructions, when executed by the controller, can also direct the controller to output a second electric heat source control signal in response to determining that the temperature data is lower than a predetermined temperature setting.

Additional features, functionalities, and applications of the disclosed technology are discussed herein in more detail.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

DETAILED DESCRIPTION

Figure 1:
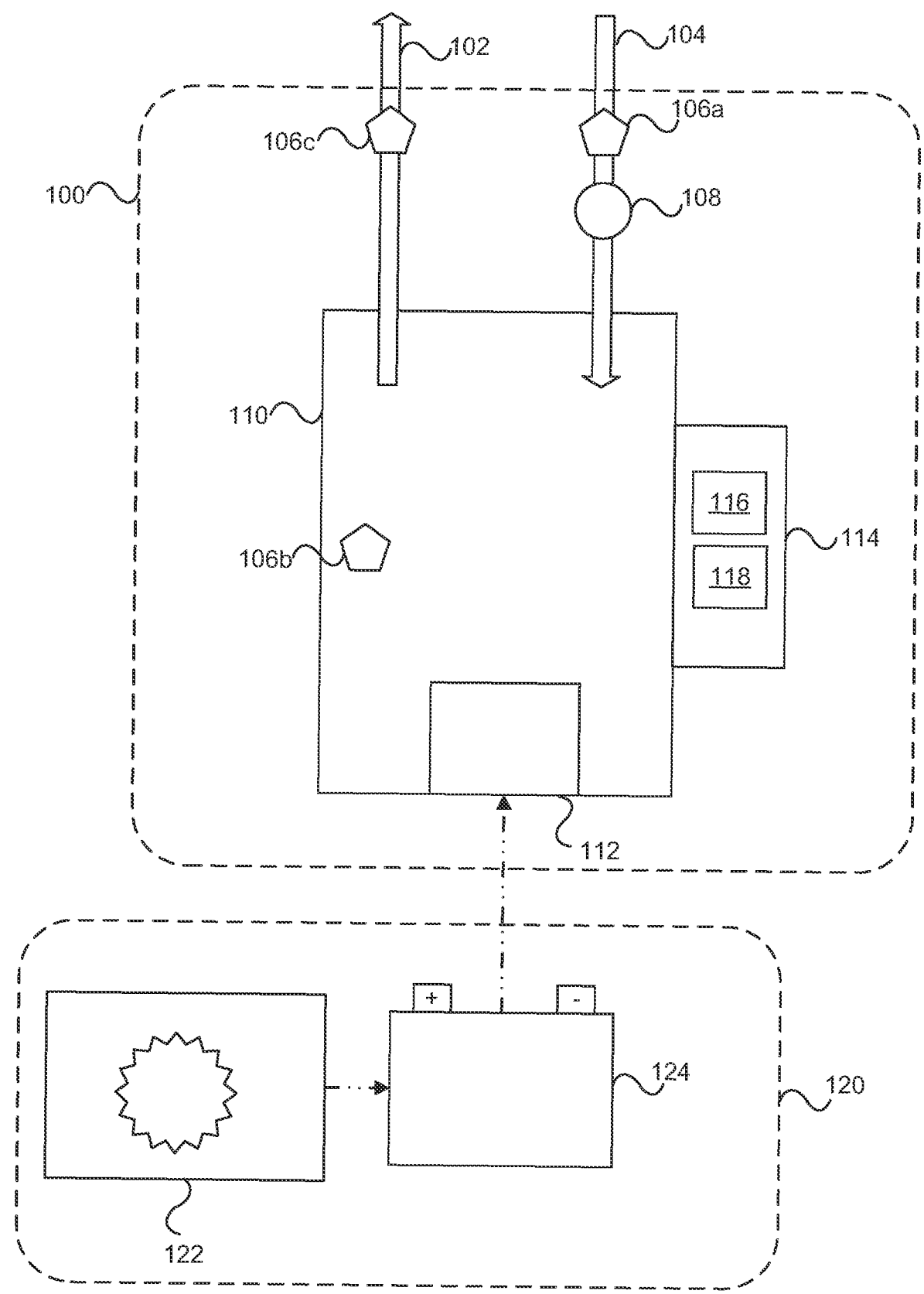
FIG. 1 is a schematic view of an on-demand water heater which can use direct current as the power source.

The disclosed technology relates to an on-demand water heater having a heat source powered by direct current to heat the water. The on-demand water heater can have a small tank and an electric heat source, such as a resistive heating element or a heat pump, powered by a direct current (DC) power source to heat the water in the tank. The electric heat source can include a solar panel and a battery but can also be connected to other direct current power sources. The on-demand water heater can be connected to a solar thermal system, including a solar heater and a holding tank, that pre-heats the water before it enters the tank. The solar thermal system can provide a preheated water to the on-demand water heater, which can decrease the amount of energy required by the on-demand water heater to heat the water to a target temperature. The on-demand water heater can be used to heat water for storage in a holding tank, which can help provide a reserve of heated water. The on-demand water heater system can also have a controller configured to control various components of the on-demand water heater system to reduce energy consumption while intelligently maintaining the water at a temperature setting.

Although certain examples of the disclosed technology are explained in detail, it is to be understood that other examples and aspects of the disclosed technology are contemplated. Accordingly, it is not intended that the disclosed technology is limited in its scope to the details of construction and arrangement of components set forth in the following description or illustrated in the drawings. The disclosed technology is capable of other embodiments and of being practiced or carried out in various ways. Also, in describing the many examples, specific terminology will be resorted to for the sake of clarity.

It should also be noted that, as used in the specification and the appended claims, the singular forms "a," "an," and "the" include plural references unless the context clearly dictates otherwise. References to a composition containing "a" constituent is intended to include other constituents in addition to the one named.

Also, in describing the example embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" or "substantially" one particular value and/or to "about" or "approximately" or "substantially" another particular value. When such a range is expressed, other example embodiments include from the one particular value and/or to the other particular value.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

It is also to be understood that the mention of one or more method steps does not preclude the presence of additional method steps or intervening method steps between those steps expressly identified. Moreover, although the term "step" may be used herein to connote different aspects of methods employed, the term should not be interpreted as implying any particular order among or between various steps herein disclosed unless and except when the order of individual steps is explicitly required.

The components described hereinafter as making up various elements of the disclosed technology are intended to be illustrative and not restrictive. Many suitable components that would perform the same or similar functions as the components described herein are intended to be embraced within the scope of the disclosed technology. Such other components not described herein can include, but are not limited to, for example, similar components that are developed after development of the presently disclosed subject matter.

To facilitate an understanding of the principles and features of the disclosed technology, various illustrative embodiments are explained below. In particular, the presently disclosed subject matter is described in the context of being a DC electric on-demand water heater. The present disclosure, however, is not so limited, and can be applicable in other contexts. For example and not limitation, some embodiments of the present disclosure may improve other fluid heating systems, whether considered on-demand or not. These embodiments are contemplated within the scope of the present disclosure. Accordingly, when the present disclosure is described in the context of a deployment system for a DC electric on-demand water heater, it will be understood that other embodiments can take the place of those referred to.

Although the present disclosure has been described in relation to heating water, it is within the scope of this disclosure to apply the disclosed technology in applications heating fluids other than water.

Referring now to the drawings, in which like numerals represent like elements, example embodiments of the present disclosure are herein described.

FIG. 1 is a schematic view of an example DC electric on-demand water heater 100 that includes a low fluid capacity heating chamber 110, a fluid inlet 104, a fluid outlet 102, a flow sensor 108, temperature sensors 106 (shown as an inlet temperature sensor 106a, a heating chamber temperature sensor 106b, and an outlet temperature sensor 106c), an electric heat source 112, and a controller 114. The electric heat source 112 can be powered by a DC power source 120, which can include a photovoltaic system 122 and a battery 124. The controller 114 can control the electric heat source 112 to maintain the temperature of the fluid at a predetermined temperature setting by analyzing data received from one or more sensors (e.g., data the flow sensor 108 and one or more of the temperature sensors 106a, 106b, and/or 106c; data from the flow sensor 108 alone; data from only one or more of the temperature sensors 106a, 106b, and/or 106c). One of skill in the art will understand that FIG. 1 is an example for illustration purposes and that the various components can be arranged in various orders and locations with the DC electric on-demand water heater 100 functioning similarly. Furthermore, one of skill in the art will understand that various other elements, such as flow control devices, valves, temperature indicators, and other fluid management or measurement devices can be added to the DC electric on-demand water heater 100 to alter its performance as desired.

The DC electric on-demand water heater 100 can be configured to be portable or installed in a fixed location. For example, the DC electric on-demand water heater 100 can be configured operate using a photovoltaic system 122 in conjunction with a battery 124 such that the DC electric on-demand water heater 100 can be used anywhere with adequate sunlight. Thus, the DC electric on-demand water heater 100 could be used as a portable hand wash station for outdoor events like races and carnivals. Alternatively, the DC electric on-demand water heater 100 could be installed to be used in an RV, a boat, a plane, or any other mobile platform in which heated fluid would be desirable. Alternatively, if the DC electric on-demand water heater 100 is intended to be installed in a fixed location, the DC electric on-demand water heater 100 can be installed in a user's home or in a commercial location.

As shown in FIG. 1, water can be heated with an electric heat source 112. The electric heat source 112 can be powered by a DC power source 120. The electric heat source 112 can be or include any form of heat source which can be powered by a direct current power source 120. As non-limiting examples, the electric heat source 112 can include an electrical resistive heating element or a heat pump. If the electric heat source 112 is a resistive heating element, the heating element can include any form of resistive heating element which would be appropriate for the application. For example, the resistive heating element can be made with a Nichrome (NiCr) resistive element surrounded by an insulating material and encased in a casing. The resistive element can be made from Nichrome, Kanthal™, Constantan, Manganin™, Balco™ or any other suitable material. The insulating material can be made from insulating material such as magnesium oxide, glass, porcelain, composite polymer materials, clay, quarts, alumina, feldspar, or any other suitable insulating material. The casing can be made from a metal (e.g., titanium, stainless steel, nichrome, Kanthal™, cupronickel, etched foil, and the like.), a ceramic (e.g., molybdenum disilicide, silicon carbide, PTC ceramic, and the like.), thick film, or a polymer PTC heating element. Furthermore, if the electric heat source 112 includes a resistive heating element, the casing can be treated or coated to help prevent corrosion and elongate the life of the element. For example, the DC electric on-demand water heater 100 can use a DC powered heat source 112, which can include a heating element with a casing made of copper and treated with a nickel plating. Alternatively or in addition, the heat source 112 can include a heating element with a copper tubing casing coated with magnesium oxide and zinc plating. Alternatively or in addition, the heat source can include a heating element with a titanium or stainless steel casing that is coated with an appropriate coating, if desired. One of skill in the art will understand that the exact materials and configuration of the heating element can vary depending on the particular application.

The electric heat source 112 can include a heat pump powered by the DC power source 120 or another power source. The heat pump can be any suitable form of heat pump that can be used to heat water, including compression- or absorption-type heat pumps. The heat pump can be adapted to use an air source, ground source, water source, or any other appropriate source of heat for operation. The heat pump can be a geothermal, air-to-water, water-to-water, liquid-to-water, or any other type of heat pump system that is appropriate for the particular application. As an example, the heat pump can be an air source type heat pump that utilizes a refrigerant in a vapor-compression cycle, but the type of heat source can be modified depending on the particular application in view of environmental factors, for example. Furthermore, the heat pump can be a single-stage, two-stage, or variable capacity heat pump depending on the application.

If the electric heat source 112 includes a heat pump, the heat pump can comprise a condenser, an expansion valve, an evaporator, and a compressor. The various components of the heat pump can be sized, shaped, and located as is appropriate for the particular application. The compressor can be any type of compressor which would be appropriate for the application. For example, the compressor can be a positive displacement compressor, a reciprocating compressor, a rotary screw compressor, a rotary vane compressor, a rolling piston compressor, a scroll compressor, a diaphragm compressor, a dynamic compressor, an axial compressor, or any other form of compressor which would be appropriate for the application. The condenser can be installed in a position and/or location that improves the energy transfer to the water in the low fluid capacity heating chamber. On the other hand, the evaporator can be positioned and/or located where it can efficiently absorb heat from its surroundings. As discussed earlier, this can include any appropriate heat source like air, water, or geothermal sources. The condenser and/or the evaporator can be made of material that can effectively exchange heat, including copper, aluminum, stainless steel, gold, silver, gallium, indium, thallium, graphite, composite materials, or any other appropriate material for the application. The appropriate application will depend, among other things, on the desired water temperature, heat transfer rate, environmental conditions, and cost considerations. Furthermore, the expansion valve can similarly be any type of expansion valve as would be appropriate in the designated application. For example, the expansion valve can be a thermal expansion valve, a manual expansion valve, an automatic expansion valve, an electronic expansion valve, a low-pressure float valve, a high-pressure float valve, capillary tubes, or any other form of expansion valve appropriate for the application. The size, type, and installed location of the expansion valve can vary depending on the application.

As shown in FIG. 1, the DC electric on-demand water heater 100 can be powered by a DC power source 120. The DC power source 120 can be any form of DC power source as would be appropriate for the particular application. The DC power source 120 can include a DC generating device paired with an energy storage device, or it can comprise just the DC generating device or just the energy storage device. As a non-limiting example, the DC power source 120 can comprise a photovoltaic system 122 paired with a battery 124, a capacitor bank, or any other type or form of energy storage. Alternatively or in addition, the DC power source 120 can comprise a wind-powered, hydro-powered, steam-power, or gas-powered turbine paired with a battery 124 or other type of energy storage. The DC power source 120 can itself comprise a battery 124 paired with an alternator (e.g., similarly to automobile applications). As yet another example, the DC power source 120 can comprise a thermoelectric generator. Furthermore, the DC power source 120 can comprise a battery 124 alone, a photovoltaic system 122 alone, an alternator alone, a wind-power turbine alone, a hydro-power turbine alone, a steam-powered turbine alone, a gas-powered turbine alone, a thermoelectric generator alone, or any other appropriate form of DC power source 120 for the application. One of skill in the art will understand that there are many power sources able provide a direct current to power the DC electric on-demand water heater 100.

The DC electric on-demand water heater 100 can be configured to switch between an alternating current power source (AC) and a direct current power source (DC). For example, the DC electric on-demand water heater 100 can operate primarily from DC power but can switch to draw power from an AC power source based on user input and/or by the controller 114 (e.g., if it is determined that there is not enough DC power available to meet current or projected demand). As another example, the DC electric on-demand water heater 100 can be configured to primarily operate on AC power and switch to DC power when instructed by the user and/or the controller 114 (e.g., if a surplus of energy is available from the DC power source 120 and/or during peak times for the AC power provider, which may carry heightened demand costs). To help facilitate timely switching between AC and DC power sources, the DC electric on-demand water heater 100 can include an energy detection sensing element to determine the type and quality of the electrical power being supplied. For example, the energy sensing element can detect when the DC power has begun to degrade and proactively switch the DC electric on-demand water heater 100 to an AC power source.

Although commonly referred to as "tankless" water heaters, on-demand water heaters often use some form of small storage tank in which to heat the water. The low fluid capacity heating chamber 110 can be used for the electric heat source 112 to add heat to the water. The low fluid capacity heating chamber 110 can be sized for various applications. For example, the low fluid capacity heating chamber 110 can be five gallons or less for a typical usage application. As another example, the low fluid capacity heating chamber 110 can be sized between one and two gallons for use with a bathroom sink in a user's home, as based on the average user's demand for hot water. Depending on the application, the low fluid capacity heating chamber 110 can be sized at 0.25 gallons, 0.5 gallons, 1 gallon, 1.5 gallons, 2, gallons, 2.5 gallons, 3 gallons, 3.5 gallons, 4 gallons, 4.5 gallons, 5 gallons, or any other appropriate size to fit the particular application. The low fluid capacity heating chamber 110 can be a single chamber or be a series of multiple chambers. The low fluid capacity heating chamber 110 can be made of any suitable material for storing and heating hot water, including copper, carbon steel, stainless steel, ceramics, polymers, composites, or any other appropriate material. Furthermore, the low fluid capacity heating chamber 110 can be treated or lined with a coating to prevent corrosion and leakage. An appropriate treating or coating will be capable of withstanding the demand temperature of the heated water and pressure of the system and can include, as non-limiting examples, glass enameling, galvanizing, thermosetting resin-bonded lining materials, thermoplastic coating materials, cement coating, or any other appropriate treating or coating for the application.

As mentioned above, the disclosed technology can include various sensing devices that collect data about fluid in the system. For example, FIG. 1 shows a flow sensor 108 and various temperature sensors 106a, 106b, 106c.

The flow sensor 108 is shown as being installed just downstream of the fluid inlet 104 but can be installed in alternative locations in fluid communication with the low fluid capacity heating chamber 110. The flow sensor 108 can be configured to detect flow data indicative of the flow of fluid at the location of the flow sensor. For example, the flow sensor 108 can be located downstream of the fluid inlet 104, inside the low fluid capacity heating chamber 110, downstream of the low fluid capacity heating chamber 110, or even upstream of the fluid inlet 104 or downstream of the fluid outlet 102 so long as the flow sensor 108 is positioned such that it can determine when fluid is flowing into and/or out of the low fluid capacity heating chamber 110.

The flow sensor 108 can be any appropriate form of flow sensor, and the appropriate type of flow sensor can depend on the specific application. The flow sensor 108 can be used to simply detect whether or not fluid is flowing or can be used to detect and/or measure the rate of flow. If it is desirable for the application to simply measure the presence of fluid flow, a flow switch can be an appropriate flow sensor 108. If the flow sensor 108 is a flow switch, it can be a vane actuated flow switch, a disc actuated flow switch, a liquid flow switch, or any other appropriate type of flow switch for the application. If it is more desirable for the application to measure the rate of fluid flow, the flow sensor 108 can be a type of flow meter. For example, the flow sensor 108 can be a differential pressure flow meter, a positive displacement flow meter, a velocity flow meter, a mass flow meter, an open channel flow meter, or any other type of flow meter appropriate for the application. The type of flow sensor 108 used will depend on the type of fluid being measured, its temperature and pressure, viscosity, conductivity, corrosiveness, and cleanliness required of the system.

Similar to the flow sensor 108, the temperature sensor(s) 106 can be installed in any appropriate location that permits the temperature sensor(s) 106 to detect temperature data indicative of a temperature of the fluid at the installed location. Although three temperature sensors are shown in FIG. 1 as temperature sensors 106a, 106b, and 106c, the DC electric on-demand water heater 100 can include a single temperature sensor 106 (at any location where the temperature sensor can detect water temperature) or additional temperature sensors 106, depending on the particular application.

Furthermore, the locations of the temperature sensors 106 as shown in FIG. 1 are for illustration purposes only, and the actual location of any given temperature sensor 106 can vary depending on the particular application. For example, a single temperature sensor 106 can be installed to provide temperature data to the controller 114 and can be located in the low fluid capacity heating chamber 110, upstream of the low fluid capacity heating chamber 110, or downstream of the low fluid capacity heating chamber 110. Alternatively, all three temperature sensors 106 can be installed as illustrated in FIG. 1 to provide temperature data of the fluid throughout the system. Alternatively or in addition, the DC electric on-demand water heater 100 can have a temperature sensor 106 installed near the fluid inlet 104 and another temperature sensor 106 installed near the fluid outlet 102.

Referring to a DC electric on-demand water heater 100 including two temperature sensors 106, one temperature sensor 106a can be installed upstream of the low fluid capacity heating chamber 110 to detect a temperature of the fluid entering the low fluid capacity heating chamber 110, and a second temperature sensor 106c can be installed downstream of the low fluid capacity heating chamber 110 and configured to sense the temperature of the water exiting the low fluid capacity heating chamber 110. The two temperature sensors 106a and 106c can be used to ensure the fluid is being properly heated to a predetermined temperature setting while the system is in use. The DC electric on-demand water heater 100 can include a temperature sensor 106b that is installed inside of the low fluid capacity heating chamber 110 and configured to detect the temperature of the fluid at a location that is representative of an average temperature of the fluid within the low fluid capacity heating chamber 110, taking into account any temperature gradient that may exist within the low fluid capacity heating chamber 110. That is, the temperature of the fluid within the low fluid capacity heating chamber 110 will likely be highest nearest the electric heat source 112 and lowest farthest from the electric heat source 112 (e.g., near the fluid inlet 104). Therefore, the temperature sensor 106b can be positioned in a location that takes such temperature differences into account and thus represents or approximates the average temperature of the fluid. Thus, the temperature sensor 106b can monitor from a single location the temperature of the fluid in the low fluid capacity heating chamber to ensure the fluid is heated to a predetermined temperature setting (e.g., while the system is on standby). This may be useful, particularly while the system is on standby, as the controller 114 can determine, based on data from the temperature sensor 106b, whether heat should be outputted from the heat source 112, even if no fluid is flowing through the low fluid capacity heating chamber 110.

The temperature sensor(s) 106 can be any type of temperature sensor capable of providing temperature data to the controller 114. For example, the temperature sensor(s) 106 can be a thermocouple, resistor temperature detector (RTD), thermistor, infrared sensor, semiconductor, or any other type of sensors which would be appropriate for a given use or application. All temperature sensors 106 of the system can be the same type of temperature sensor, or the system can include different types of temperature sensors 106. For example, temperature sensor 106a can be a thermocouple, temperature sensor 106b can be an RTD, and temperature sensor 106c can be a thermistor. One skilled in the art will appreciate that the type, location, and number of temperature sensors can vary greatly depending on the application.

The electric heat source 112 and other aspects of the system can be controlled by a controller 114. The controller 114 can include a computing device configured to receive data, determine actions based on the received data, and output control signals instructing one or more components of the system to perform one or more actions. Although shown in FIG. 1 as being mounted on the side of the low fluid capacity heating chamber 110, one of skill in the art will understand that the controller 114 can be installed anywhere as deemed appropriate for the particular application, provided the controller 114 is in communication with at least some of the components of the system. This can include installation in or on an enclosure containing the other components depicted in FIG. 1 or installation entirely separate from the other components shown in FIG. 1 (including a remote location, such as the "cloud"). Furthermore, the controller can be configured to send and receive wireless, hard-wired, or digital signals. The wireless signals can include Bluetooth™, BLE, WiFi™, ZigBee™, infrared, microwave radio, or any other type of wireless communication as can be appropriate for the particular application. The hard-wired signal can include any directly wired connection between the controller and the other components. For example, the controller 114 can have a hard-wired 120-volt connection to the electric heat source 112 which directly energizes the electric heat source 112. The digital connection can include a connection such as an Ethernet or a serial connection and can utilize any appropriate communication protocol for the application such as Modbus, Foundation Fieldbus, PROFIBUS, SafetyBus p, Ethernet/IP, or any other appropriate communication protocol for the application. Furthermore, the controller 114 can utilize a combination of both wireless, hard-wired, and digital communication signals to communicate with and control the various components. One of skill in the art will appreciate that the above configurations are given merely as non-limiting examples and the actual configuration can vary depending on the application.

The controller 114 can include memory 116, which can include one or more suitable types of memory (e.g., volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like) for storing files including an operating system, application programs, executable instructions and data. One, some, or all of the processing techniques described herein can be implemented as a combination of executable instructions and data within the memory 116.

The controller 114 can also have a processor 118. The processor 118 can be one or more known processing devices, such as a microprocessor or the like, and can constitute a single-core or multiple-core processor that executes parallel processes simultaneously. For example, the processor 118 can be a single core processor that is configured with virtual processing technologies. One of ordinary skill in the art would understand that other types of processor arrangements could be implemented that provide for the capabilities disclosed herein.

As shown in FIG. 1, the controller 114 can be configured to receive data from the flow sensor 108 and various temperature sensors 106. For example, the controller 114 can receive flow data from the flow sensor 108, determine whether the flow data indicates a positive flow rate of the fluid, and output instructions for the electric heat source 112 to activate in response to determining the fluid in the system has begun to flow. Alternatively or in addition, the controller 114 can receive temperature data from a temperature sensor 106, determine whether the temperature data indicates a temperature that is lower than a temperature setting (e.g., a predetermined temperature setting, a variable temperature setting, a user-inputted temperature setting), and output instructions for the electric heat source 112 to activate in response to determining the current temperature is lower than the temperature setting. The controller 114 can be configured to base its decisions on temperature data from one, some, or all the temperature sensors 106. As an example, each temperature sensor 106 can be weighted based on the type of sensor, location of the sensor, or other information. Thus, the controller 114 can be configured to make certain determinations and output certain instructions if a predetermined weight value of the combined temperature data is above a certain threshold.

The controller 114 can receive temperature data from one or more temperature sensors 106 and/or flow data from one or more flow sensors 108. Based on the temperature data and/or the flow rate data, the controller 114 can determine whether the electric heat source 112 should be activated and/or how much heat should be outputted by the electric heat source 112. The controller 114 can be configured to determine whether the current temperature setting (e.g., the requested or demanded temperature of output fluid) can be maintained considering the temperature data, flow rate data, heat output from the electric heat source 112, and/or energy available from the DC power source. As a response, the controller 114 can modulate the output of the electric heat source 112 to vary its performance and thus adjust the amount of heat provided to the fluid. For example, in response to receiving flow rate data indicative of the fluid flow at a rate of 1.5 gal/min and temperature data indicative of a fluid temperature of 113° F. at a location downstream of the low fluid capacity heating chamber 110 and temperature setting of 113° F., the controller 114 can extrapolate whether the fluid having a temperature of 113° F. can be reliably provided given the current fluid low rate and the current heat output of the electric heat source 112. In response to determining that the current heat output of the electric heat source 112 is inadequate to maintain the water temperature at the temperature setting, the controller 114 can, for example, transmit a control signal to the electric heat source 112 instructing the electric heat source 112 to operate at a higher heat output.

As briefly discussed above, the controller 114 can be configured to respond to data from the flow sensor 108 and the temperature sensors 106. The controller 114 can be configured to maintain the temperature of the fluid being delivered to the user within a predetermined temperature range. The predetermined temperature range can be set by the manufacturer and/or can be set by a user. As an example, the predetermined temperature range can be from approximately 131° F. to approximately 133° F. In response to determining that the fluid temperature has fallen below 131° F., the controller 114 can output instructions for the electric heat source 112 to increase heat output. Similarly, in response to determining that the fluid temperature has risen above 133° F., the controller 114 can output instructions for the electric heat source 112 to electric heat source 112 to decrease heat output and cease adding heat to the fluid (or add less heat to the fluid).

Optionally, the controller 114 can be configured to maintain fluid inside the low fluid capacity heating chamber 110 within a first, relatively broad temperature range when fluid is not currently demanded and a second, narrower range when fluid is demanded. Either temperature range can be set by the manufacturer and/or set or changed by a user. Continuing the above example, the controller 114 can be configured to provide fluid having a temperature in the range from approximately 131° F. to approximately 133° F. The controller 114 can be configured to maintain fluid within the same temperature range while fluid is being demanded. When fluid is not being demanded, the controller 114 can be configured to maintain fluid temperature in the range from approximately 123° F. to approximately 133° F. Thus, in response to determining that the fluid temperature has fallen below 123° F., the controller 114 can output instructions for the electric heat source 112 to increase heat output, and in response to determining that the fluid temperature has risen above 133° F., the controller 114 can output instructions for the electric heat source 112 to electric heat source 112 to decrease heat output and cease adding heat to the fluid (or add less heat to the fluid). One of skill in the art will understand that these temperature ranges and responses are offered merely as examples and that the actual configuration can be varied depending on the application.

Figure 2:
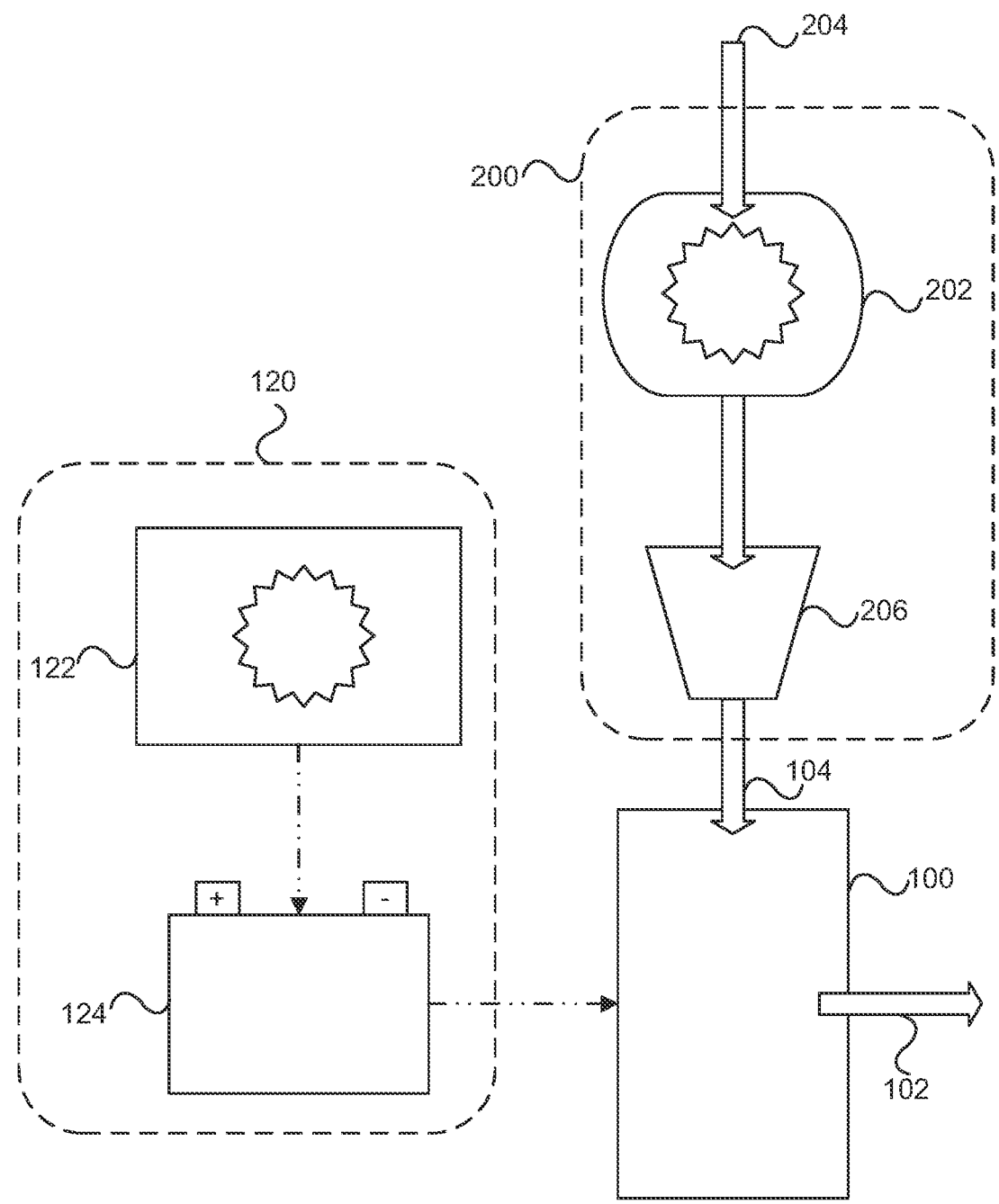
FIG. 2 is a schematic view of an on-demand water heater which can use direct current as the power source and a solar thermal water source.

FIG. 2 is a schematic view of an example DC electric on-demand water heater 100 paired with a solar thermal system 200. As an example, the solar thermal system can comprise a solar thermal collector 202 and a solar thermal reservoir 206. This example differs from others previously discussed in that cold water first enters the solar thermal system 200 through inlet 204 and later enters the DC electric on-demand water heater 100 through the fluid inlet 104. The solar thermal system 200 can be configured to provide pre-heated water to the DC electric on-demand water heater 100, which can reduce the amount of energy required by the DC electric on-demand water heater 100 to heat fluid. The controller 114 can control the electric heat source 112 in the same manner as previously discussed, but the amount of energy (e.g., energy stored by the DC power source 120) required to sufficiently heat the fluid can be reduced by heat transferred to the fluid via the solar thermal system 200. The solar thermal heat source 202 can be configured to heat water as sunlight strikes an absorber surface, by which heat can generated and/or obtained. The heated water is then stored in a solar thermal reservoir 206 which can be insulated and provides a source of pre-heated water for the DC electric on-demand water heater 100 when water is drawn through the system.

The solar thermal system 200 can be any form of solar thermal system as would be appropriate for the particular application. For example, the solar thermal system 200 can be a closed-loop or an open-loop system and it can be either actively or passively circulated. If the solar thermal system 200 is a closed-loop system, it can use a heat exchanger with any appropriate heat transfer fluid. The heat transfer fluid can be distilled water, propylene glycol, ethylene glycol, triethylene glycol, glycol-water mix, alcohol-water mix, mineral oil, or any other heat transfer fluid appropriate for the application. The solar thermal collector can be a flat plate collector, an evacuated tube collector, a hydronic coil, or any other appropriate form of solar thermal collector for the application. Furthermore, the solar thermal reservoir 206 can be any appropriate form of reservoir for the application. For example, the solar thermal reservoir can be an ordinary hot water tank, or it can be a custom-made reservoir built for the specific application.

Figure 3:
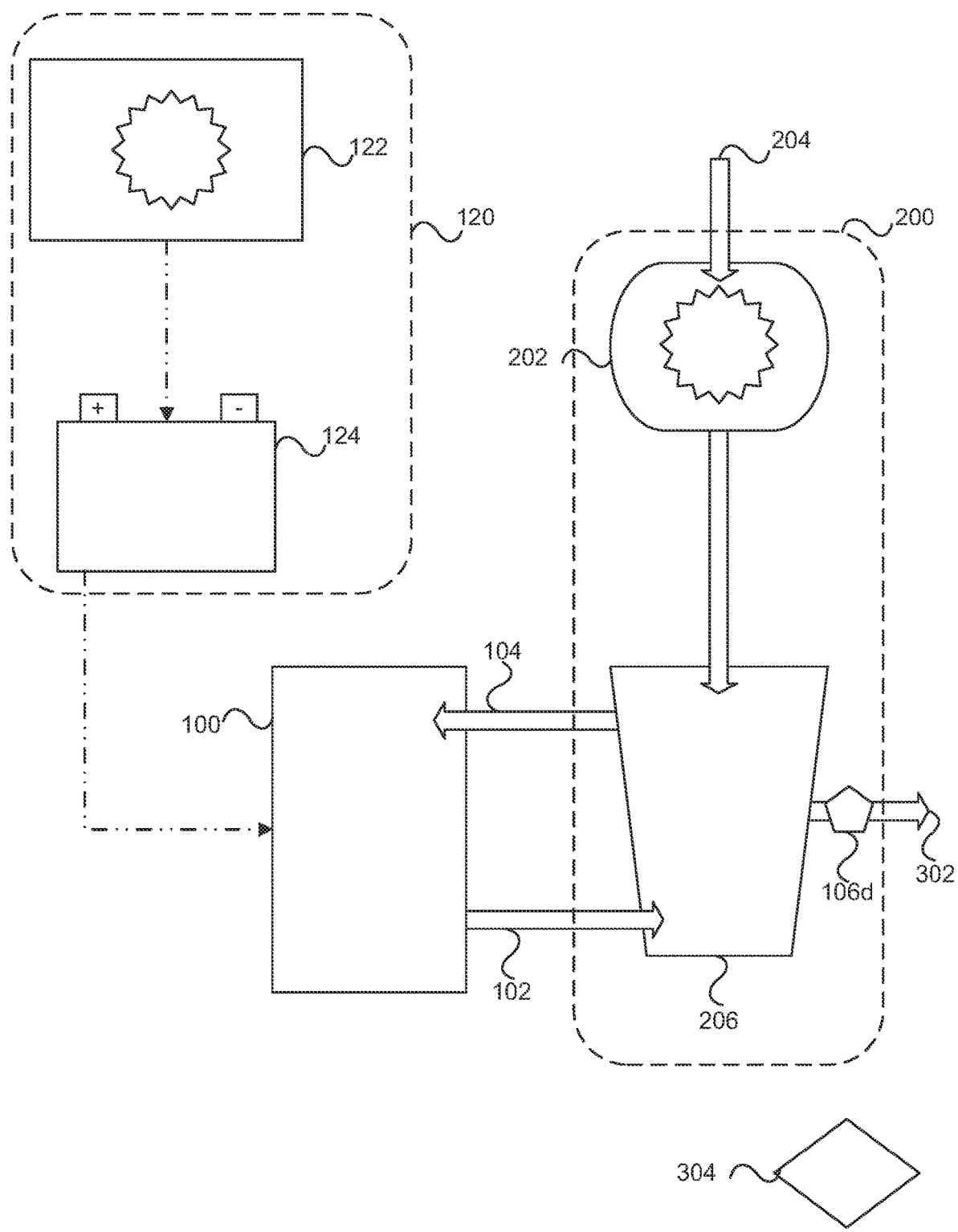
FIG. 3 is a schematic view of an on-demand water heater which can use direct current as the power source and a solar thermal water source which is routed in an indirect path.

FIG. 3 is a schematic view of a DC electric on-demand water heater 100 integrated with a solar thermal system 200 that is routed in an indirect path. The DC electric on-demand water heater 100 can include additional sensors, such as proximity sensor 304 and temperature sensor 106*d*. Similarly to the previous example, cold water can enter the solar thermal system 200 through inlet 204 and can pass as pre-heated water from the solar thermal system 200 to the DC electric on-demand water heater 100 via the fluid inlet 104. The water passing through the DC electric on-demand water heater 100 can be configured to pass back through the solar thermal reservoir 206 prior to exiting the system through fluid outlet 302 and heading to the point of use. This configuration provides the added benefit of allowing for the water in the solar thermal reservoir 206 to be heated even when the sun it not available to heat the water in the solar thermal system 200 by using an energy storage device, like a battery 124, to power the electric heat source 112. The temperature sensor 306*d* can be used to acquire temperature data of the fluid in the system at any desired location, such as at a location to ensure fluid exiting the thermal storage reservoir 206 has been properly heated according to a temperature setting. The temperature sensor 306*d* can be any form of temperature sensor, such as those previously discussed.

The controller 114 can be configured to intelligently conserve DC energy such that DC energy can be directed to heat the water in the solar thermal reservoir 206 only as needed. Because DC energy has many uses other than heating water (e.g., powering electrical appliances, powering lights, charging electronic devices, and the like) and because energy used to heat water cannot be easily converted back into stored electrical energy, the controller 114 can be configured to learn usage patterns of the user and heat the water in the solar thermal reservoir 206 when the controller 114 anticipates hot water will be needed. For example, a user might not need hot water at night or while the user is sleeping but may need to power electronic devices in her home. The controller 114 can intelligently redirect the stored DC energy away from heating the water and to the other uses. As another example, the controller 114 can learn that the user usually needs hot water to shower while getting ready for work in the morning and can heat the water just prior to when the user usually needs it rather than maintaining the temperature all night. Furthermore, the controller 114 can be configured to receive a signal or sensor data indicating that a user is nearby a point of use (e.g., a faucet, a shower head, a hose, and the like). For example, the controller 114 can be used in conjunction with a proximity sensor 304 installed near the point of use to detect when a user is nearby. When the controller 114 receives data from the sensor 304 indicating that a user is nearby, the controller can proactively direct the electric heat source 112 to begin adding heat to the system so that heated water is available for the nearby user. The sensor 304 can be any form of sensor as would be appropriate for detecting when a user may be nearby. For example, the sensor 304 can be a motion detector, an ultrasonic detector, thermal sensor, infrared sensor, light curtain, laser sensor, capacitive sensor, weight sensor, or any other appropriate sensor which is capable of detecting the presence of a user.

Alternatively, the controller 114 can receive a signal not from a sensor which still indicates that a user is nearby. For example, the controller 114 can be tied to a user's light switch and configured to receive a signal when the user has turned on a light switch. As another example, the controller 114, can be integrated with other smart home devices in the home which can send a signal to the controller 114 to inform it that a user may be nearby. For example, the smart home device can be managed by a smart home hub which is tied to the user's mobile device. When the user awakes in the morning and uses her mobile device, the smart home hub can be notified that the user is awake, and the smart home hub can then send a signal to the controller 114 to inform the controller 114 that the user is awake. In turn, the controller 114 can send a control signal to the electric heat source 112 to begin heating the fluid. One of skill in the art will understand that these examples are given merely for illustration purposes and the actual configuration can vary depending on the particular application.

Figure 4:
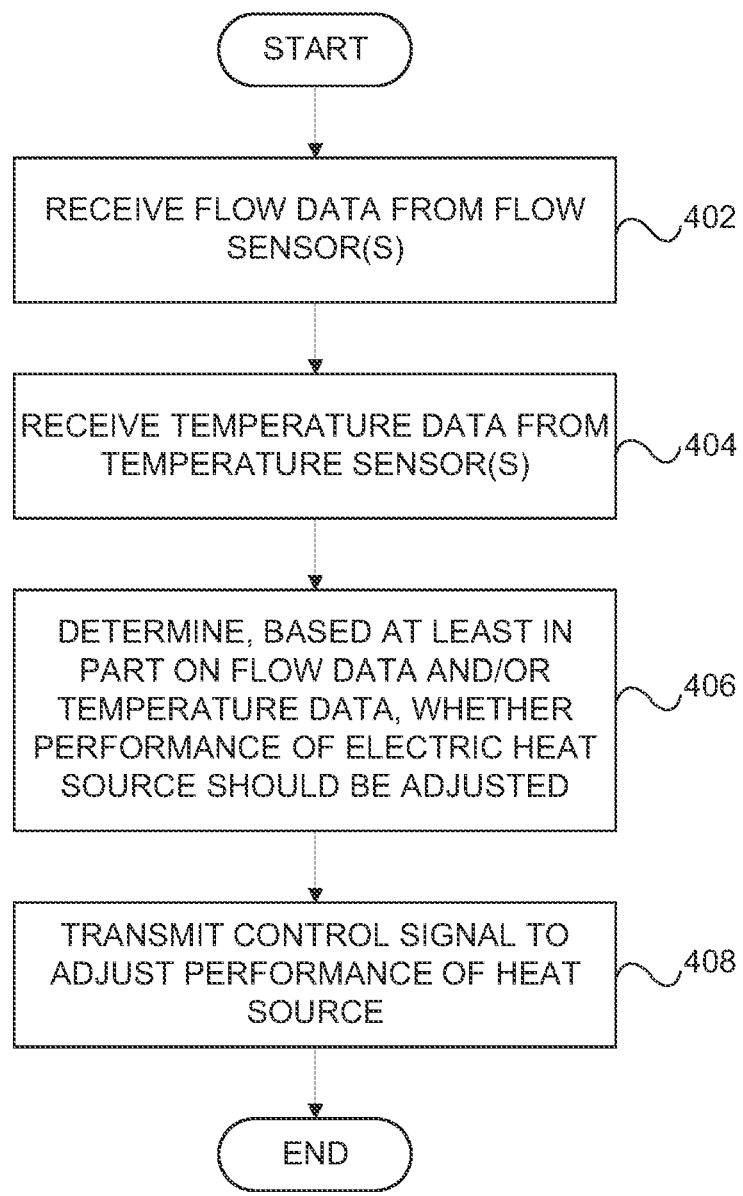
FIG. 4 is a diagram of a method of operating an on-demand water heater using direct current as the power source.

FIG. 4 is a diagram of a method 400 for controlling a DC electric on-demand water heater 100 according to the disclosed technology. This method 400 is not meant to limit the many different configurations in which the controller 114 can function but is given merely as an example for illustrative purposes. Furthermore, one of skill in the art will understand that the disclosed technology includes methods and processes including some but not all steps of method 400 and/or includes methods and processes including steps not expressly discussed with respect to method 400. For example, the disclosed technology includes any methods or processes encompassing the many different aspects of the disclosed DC electric on-demand water heater 100 and related systems as discussed herein.

The method 400 can include receiving 402 flow data from a flow sensor (e.g., flow sensor 108), and the flow data can be indicative of a flow of a fluid within some portion of a water heater (e.g., DC electric on-demand water heater 100). The method 400 can include receiving 404 temperature data from a temperature sensor (e.g., temperature sensor 106*a*, 106*b*, 106*c*, and/or 106*d*), and the temperature data can be indicative of a temperature of the fluid at the location of the corresponding temperature sensor. The method 400 can include analyzing the received temperature data and/or flow data to determine 406 whether performance of the electric heat source 112 should be adjusted. For example, the method 400 can include determining, based on at least the temperature data and a temperature setting, whether the water temperature is below the temperature setting. If the water temperature is below the temperature setting, the method 400 can include transmitting instructions and/or a control signal for the electric heat source 112 to activate or increase heat output. If the water temperature is at or above the temperature setting, the method 400 can include transmitting instructions and/or a control signal for the electric heat source 112 to deactivate of decrease heat output. It will be understood that the method 400 can include using data from one, some, or all of the various sensors (e.g., the flow sensor 108, the temperature sensor(s) 106) to determine whether one or more components of the DC electric on-demand water heater 100 should perform various actions to control the temperature of water in the system. One of skill in the art will understand that the particular method 400 discussed above is offered merely for illustrative purposes and the actual method of controlling the temperature of water or other fluid can vary.

While the present disclosure has been described in connection with a plurality of exemplary aspects, as illustrated in the various figures and discussed above, it is understood that other similar aspects can be used or modifications and additions can be made to the described aspects for performing the same function of the present disclosure without deviating therefrom. For example, Although certain components have been discussed with respect specific examples and figures, it will be understood that the various components, functionalities, and capabilities of any given example or figure can be incorporated into any other example or figure. As another example, in various aspects of the disclosure, methods and compositions were described according to aspects of the presently disclosed subject matter. But other equivalent methods or composition to these described aspects are also contemplated by the teachings herein. Therefore, the present disclosure should not be limited to That which is claimed is:

1. A direct current (DC) electric fluid heating system comprising:
   a DC electric fluid heating device comprising:
      a heating chamber having a fluid inlet and a fluid outlet, the heating chamber being configured to hold a fluid and having a fluid capacity from 0.5 gallons to 5 gallons;
      an electric heat source comprising a resistive heating element configured to heat the fluid;
      a flow sensor configured to detect a flow of a fluid to or from the heating chamber;
      a temperature sensor configured to detect a temperature of a fluid flowing to or from the heating chamber or within the heating chamber; and
      a controller configured to:
         receive flow data from the flow sensor, the flow data indicative of the fluid flow;
         receive temperature data from the temperature sensor, the temperature data indicative of the fluid temperature;
         determine whether a heat output of the electric heat source should be adjusted based on at least two of the flow data, the temperature data, or a temperature setting; and
         output instructions for modulating an amount of DC power supplied to the electric heat source from a DC power source in response to determining that the heat output of the electric heat source should be adjusted.

2. The DC electric fluid heating system of claim 1, wherein the DC power source comprises a photovoltaic energy system.

3. The DC electric fluid heating system of claim 1, wherein the DC power source comprises one or more batteries.

4. The DC electric fluid heating system of claim 1, further comprising a solar thermal fluid heating system in fluid communication with the DC electric fluid heating device, the solar thermal fluid heating system configured to receive solar energy, convert solar energy to supplemental heat, and transfer at least some of the supplemental heat to the fluid.

5. The DC electric fluid heating system of claim 4, further comprising a storage tank configured to store the fluid.

6. The DC electric fluid heating system of claim 5, wherein the DC electric fluid heating device is configured to receive fluid from the storage tank and provide heated fluid to the storage tank.

7. The DC electric fluid heating system of claim 1, wherein the controller is configured to monitor the flow data and the temperature data to determine a fluid usage pattern associated with fluid demanded from the DC electric fluid heating system.

8. The DC electric fluid heating system of claim 1, further comprising a proximity sensor located near a point of use that is in fluid communication with the DC electric heating device, wherein the controller is configured to receive proximity data indicating a user is near the point of use, the controller configured to output instructions for increasing a heat output of the electric heat source based at least in part on the proximity data.

9. The DC electric fluid heating device of claim 1, wherein the resistive heating element comprises a metal resistive element surrounded by an insulating material.

10. The DC electric fluid heating device of claim 9, wherein the metal resistive element comprises nickel-chromium.

11. The DC electric fluid heating device of claim 9, wherein the insulating material comprises magnesium oxide, glass, porcelain, composite polymer materials, clay, quartz, alumina, or feldspar.

12. The DC electric fluid heating device of claim 9, wherein the metal resistive element and insulating material are encased in a casing.

13. The DC electric fluid heating device of claim 12, wherein the casing comprises titanium, stainless steel, molybdenum disilicide, silicon carbide, or a positive temperature coefficient (PTC) ceramic.

14. The DC electric fluid heating device of claim 12, wherein the casing is treated or coated to mitigate corrosion.

15. A direct current (DC) electric fluid heating system comprising:
   (i) a DC electric fluid heating device comprising:
      a heating chamber having a fluid inlet and a fluid outlet, the heating chamber being configured to hold water and having a fluid capacity from 0.5 gallons to 5 gallons;
      an electric heat source comprising a resistive heating element configured to heat the water;
      a flow sensor configured to detect a flow of water to or from the heating chamber;
      a temperature sensor configured to detect a temperature of water flowing to or from the heating chamber or within the heating chamber; and
      a controller configured to:
         receive flow data from the flow sensor, the flow data indicative of the water flow;
         receive temperature data from the temperature sensor, the temperature data indicative of the water temperature;
         determine whether a heat output of the electric heat source should be adjusted based on at least two of the flow data, the temperature data, or a temperature setting; and
         output instructions for modulating an amount of DC power supplied to the electric heat source from a DC power source in response to determining that the heat output of the electric heat source should be adjusted; and
   (ii) a solar thermal fluid heating system in fluid communication with the DC electric fluid heating device, wherein the solar thermal fluid heating system is configured to receive solar energy, convert solar energy to supplemental heat, and transfer at least some of the supplemental heat to the water.

16. The DC electric fluid heating system of claim 15, which is configured such that cold water enters the solar thermal system and preheats the water and the preheated water then enters the DC electric fluid heating device.

17. The DC electric fluid heating system of claim 15, wherein the solar thermal fluid heating system comprises a holding tank in fluid communication with and between a solar heater and the DC electric fluid heating device, which is an on-demand water heater.

18. A direct current (DC) electric fluid heating system comprising:
   a DC electric fluid heating device comprising:
      a heating chamber having a fluid inlet and a fluid outlet, the heating chamber being configured to hold a fluid;
      an electric heat source comprising a heat pump configured to heat the fluid;

a flow sensor configured to detect a flow of a fluid to or from the heating chamber;

a temperature sensor configured to detect a temperature of a fluid flowing to or from the heating chamber or within the heating chamber; and a controller configured to:
receive flow data from the flow sensor, the flow data indicative of the fluid flow;

receive temperature data from the temperature sensor, the temperature data indicative of the fluid temperature;

determine whether a heat output of the electric heat source should be adjusted based on at least two of the flow data, the temperature data, or a temperature setting; and output instructions for modulating an amount of DC power supplied to the electric heat source from a DC power source in response to determining that the heat output of the electric heat source should be adjusted.

19. The DC electric fluid heating system of claim 18, which is an on-demand water heater.

20. The DC electric fluid heating system of claim 19, wherein the heat pump is an air source type heat pump that utilizes a refrigerant in a vapor-compression cycle.

\* \* \* \* \*